(12) United States Patent
Niguet et al.

(10) Patent No.: US 7,851,716 B2
(45) Date of Patent: Dec. 14, 2010

(54) DETECTION DEVICE AND SEAT COMPRISING ONE SUCH DEVICE

(75) Inventors: Ludovic Niguet, Valence (FR); Stéphane Collot, Chateaudouble (FR)

(73) Assignee: Crouzet Automatismes, Valence (FR)

( * ) Notice: Subject to any disclaimer, the term of this patent is extended or adjusted under 35 U.S.C. 154(b) by 372 days.

(21) Appl. No.: 12/087,773

(22) PCT Filed: Jan. 25, 2007

(86) PCT No.: PCT/FR2007/000141
§ 371 (c)(1),
(2), (4) Date: Jul. 15, 2008

(87) PCT Pub. No.: WO2007/085732
PCT Pub. Date: Aug. 2, 2007

(65) Prior Publication Data
US 2010/0148549 A1   Jun. 17, 2010

(30) Foreign Application Priority Data
Jan. 30, 2006   (FR) ................................. 06 00806

(51) Int. Cl.
*H01H 9/28* (2006.01)
(52) U.S. Cl. .................................................. 200/43.18
(58) Field of Classification Search ............. 200/43.19, 200/43.02, 43.18, 43.21, 323–325, 321, 318–318.2, 200/293; 297/217.1–217.3; 340/667, 666
See application file for complete search history.

(56) References Cited

U.S. PATENT DOCUMENTS

| | | | | |
|---|---|---|---|---|
| 3,448,417 A | * | 6/1969 | Schiller et al. | ............. 200/5 E |
| 5,679,936 A | * | 10/1997 | Schaeffer et al. | ......... 200/43.07 |
| 6,546,780 B1 | | 4/2003 | Palfenier et al. | ............. 73/1.75 |
| 7,057,127 B1 | * | 6/2006 | Kuan | ........................ 200/43.18 |
| 2002/0145418 A1 | | 10/2002 | Becker | ...................... 324/207.2 |
| 2003/0117000 A1 | | 6/2003 | Barnabo et al. | .......... 297/217.1 |
| 2004/0262962 A1 | | 12/2004 | Young et al. | ............. 297/217.3 |

* cited by examiner

*Primary Examiner*—Felix O Figueroa
(74) *Attorney, Agent, or Firm*—Steptoe & Johnson LLP

(57) ABSTRACT

A detection device comprises a case formed by at least a first and second part able to move with respect to one another between a first and second operating position. Said device comprises an electric contact comprising at least two electric states, closed or open, each electric state being associated with one of the operating positions of the first and second parts, and securing means designed to fix said case onto an external support. Said securing means comprise locking means designed to perform holding of the two parts of the case in one of the two operating positions, fixing of the case onto the support by the securing means rendering the locking means inoperative.

9 Claims, 3 Drawing Sheets

DETECTION DEVICE AND SEAT COMPRISING ONE SUCH DEVICE

The present application is based on International Application PCT/FR2007/000141 filed Jan. 25, 2007, which claims priority of French Patent Application No. 0600806, filed Jan. 30, 2006, the entire contents of which are hereby incorporated by reference.

BACKGROUND OF THE INVENTION

The invention relates to a detection device comprising a case formed by at least a first and second part able to move in translation with respect to one another between a first and second operating position. Said device comprises holding means exerting a holding force opposing movement of the first and second parts from the first operating position to the second operating position. The detection device comprises an electric contact comprising at least two electric states, closed or open, each electric state being associated with one of the operating positions of the first and second parts and securing means designed to hook said case onto an external support. The invention also relates to a seat comprising one such device.

STATE OF THE ART

A large number of solutions enable the presence of objects or bodies on a support to be detected. Electromechanical detection devices designed for detecting persons or objects on seats notably exist, more particularly on automobile vehicle seats.

Detection devices essentially comprise an electric contact placed between two elements at least one of which is movable with respect to the other. Movement of the first element towards the second element generally results in a change of electric state of the contact, after a travel movement. Intermediate mechanical means such as a control button or operating rod can be used to transmit the movement of the elements. The intermediate mechanical means are then driven by the movement of the element or elements and change the state of the contact.

The contact is generally in an open electric state before movement of the elements and switches to a closed electric state after movement.

In case of detection of a passenger on a seat, the detection device contact can be positioned under the seating surface of the vehicle seat. As soon as the passenger sits on the seat, the seat is deformed in direction and switches the detection device contact. The contact, which is in an open state, switches to a closed state. A closing signal is then supplied to processing means.

Satisfactory operation of this type of electromechanical solution is greatly dependent on the geometric positioning of the detection device with respect to the support.

When the detection device is positioned in a seat, it may be difficult to check correct positioning of said device after the latter has been fixed onto the support. An uncertainty then exists as to correct operation of the detection device. This type of shortcoming is commonly observed when the detection device is integrated in a car seat.

SUMMARY OF THE INVENTION

The object of the invention is therefore to remedy the shortcomings of the state of the technique so as to propose a detection device the positioning of which on the support can be easily checked.

The securing means of the detection device according to the invention comprise locking means keeping the two parts of the case in the second operating position when the case is not fixed, the locking means being inoperative when the case is fixed onto the support The electric contact is preferably in a closed electric state when the two parts are in the second operating position, the electric contact being in an open electric state when the first and second part are in the first operating position.

In a particular embodiment, the securing means comprise at least one flexible arm having a first end fixedly attached to the first part and a second end comprising the locking means designed to couple with the second part in the second operating position.

Advantageously, the second part is sliding with respect to the first part of the case.

Advantageously, the securing means comprise flexible arms arranged in uniform manner on a peripheral surface of the first part of the case.

A seat according to an embodiment of the invention comprises at least one deformable seating surface on which a passenger is to sit, and a rigid frame designed to be fixed to a vehicle. Such a detection device as defined above is secured by the securing means under the seating surface.

Advantageously, the seating surface comprises a deformable foam directly commanding movement of the second part of the case to the first operating position.

According to one embodiment of the invention, the deformable foam is in contact with the second part.

In a particular embodiment, the seat comprises a backrest in which a detection device as defined above is positioned, said detection device detecting deformation of a first part of the backrest with respect to a second part of the backrest.

BRIEF DESCRIPTION OF THE DRAWINGS

Other advantages and features will become more clearly apparent from the following description of a particular embodiment of the invention, given for non-restrictive example purposes only, and represented in the accompanying figures.

DETAILED DESCRIPTION OF AN EMBODIMENT

According to a first embodiment presented in FIGS. 1 to 5, the detection device comprises a case composed of at least a first and second part 2, 3.

First and second parts 2, 3 can move with respect to one another between a first and second operating position of the detection device.

The first and second operating position preferably correspond respectively to an active detection state and an inactive detection state of the detection device.

Figure 1:
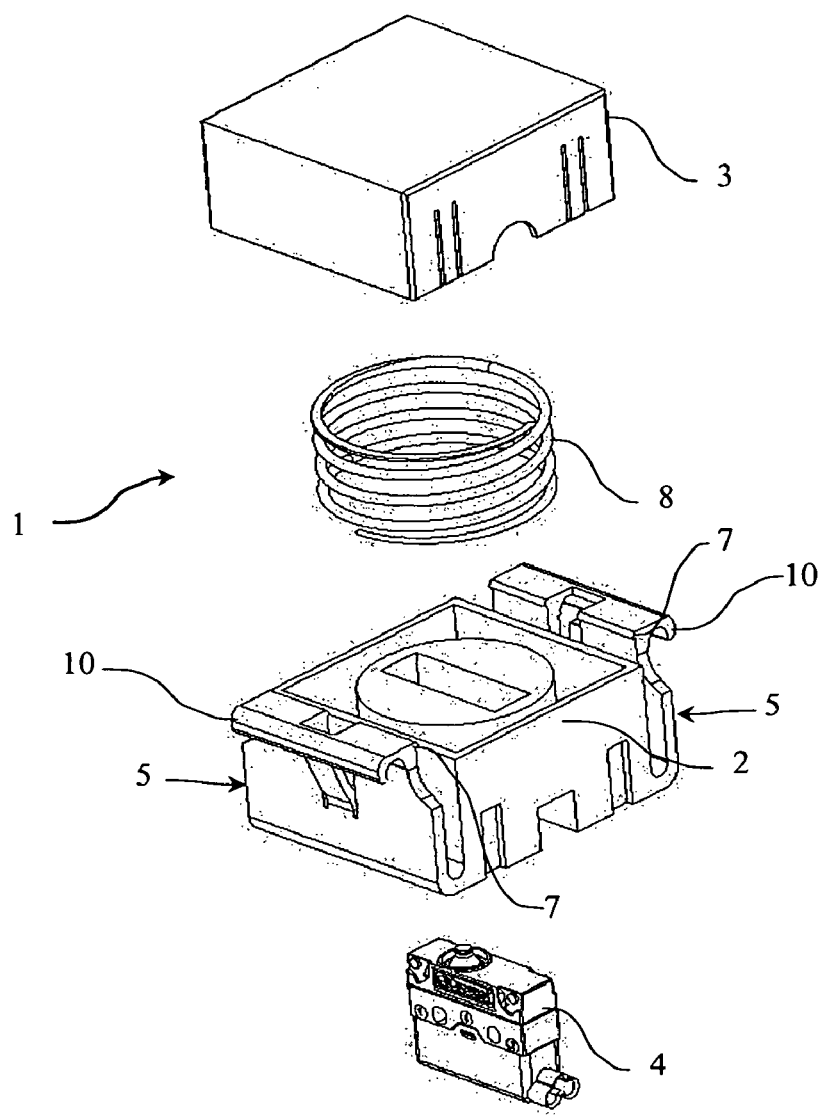
FIG. 1 represents an exploded perspective view of the detection device according to an embodiment of the invention.
Figure 2:
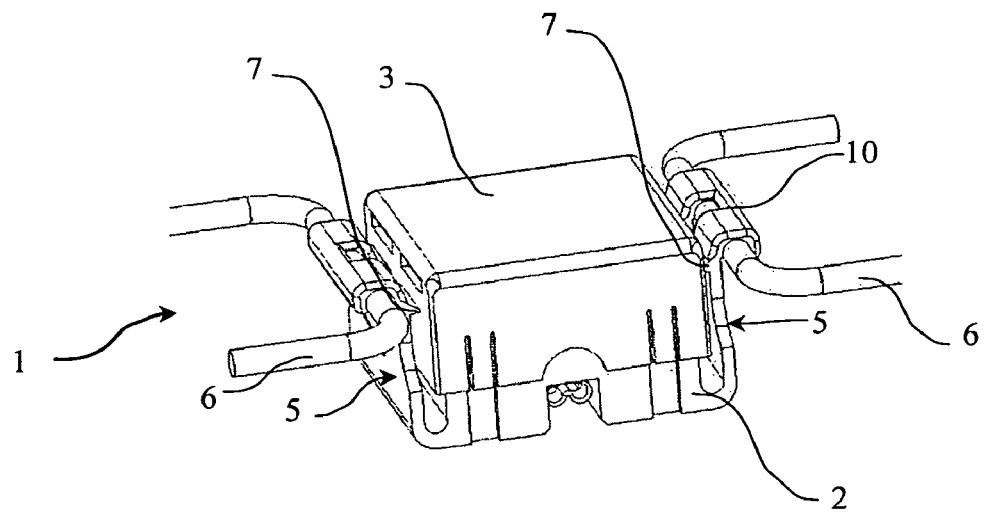
FIG. 2 represents a perspective view of the detection device according to FIG. 1, fixed onto a support.

According to this embodiment, as represented in FIG. 2, second part 3 is fitted sliding with respect to first part 2 of case 1. Furthermore, according to this embodiment, case 1 is substantially of parallelepiped shape. The volume of the parallelepiped varies according to the operating position of parts 2, 3.

An electric contact 4 is positioned inside case 1 between first and second parts 2, 3. Electric contact 4 comprises at least two electric states, a closed electric state and an open electric state. Each electric state is respectively associated with one of the operating positions of first and second parts 2, 3 and therefore to an active or inactive detection state of the detection device. This contact 4 is generally connected to processing and analysis means that are not represented. The closing signal resulting from the change of electric state of the contact can be analyzed by said processing means.

First and second parts 2, 3 are kept in one of the operating positions by holding means 8. According to this embodiment, holding means 8 comprise a compression spring.

Holding means 8 tend to move parts 2, 3 away from one another so as to place the detection device in a first operating position. A holding force exerted by holding means 8 tends to oppose movement of first and second parts 2, 3 to second operating position.

According to this embodiment, second part 3 is then farthest away from first part 2. The volume of case 1 is then maximal.

The detection device comprises securing means 5 designed to secure said device on an external support 6. According to this development of the invention, securing means 5 are more particularly designed to secure the detection device on the seat of an automobile vehicle. External support 6 is then composed mainly of a trellis constituting one of the elements of a support structure of an automobile seat. Securing means 5 then comprise at least one hook 10 that fixes onto one of the meshes of the trellis.

Figure 3:
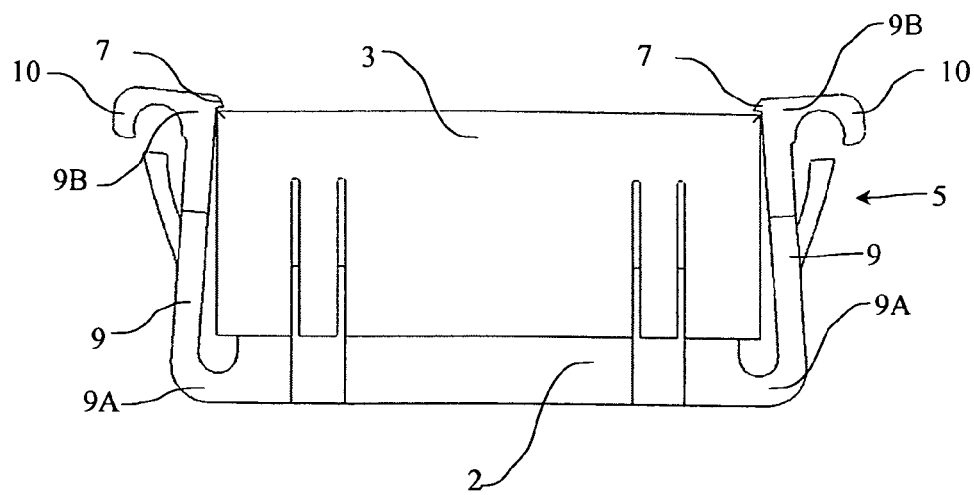
FIG. 3 represents a side view of the detection device according to FIG. 1, not fixed onto a support.
Figure 4:
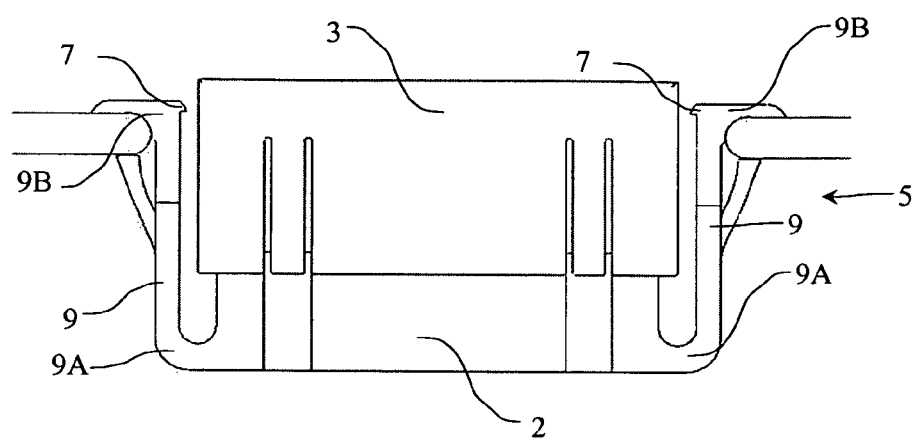
FIG. 4 represents a side view of the detection device according to FIG. 1, fixed onto a support and in an inactive state.
Figure 5:
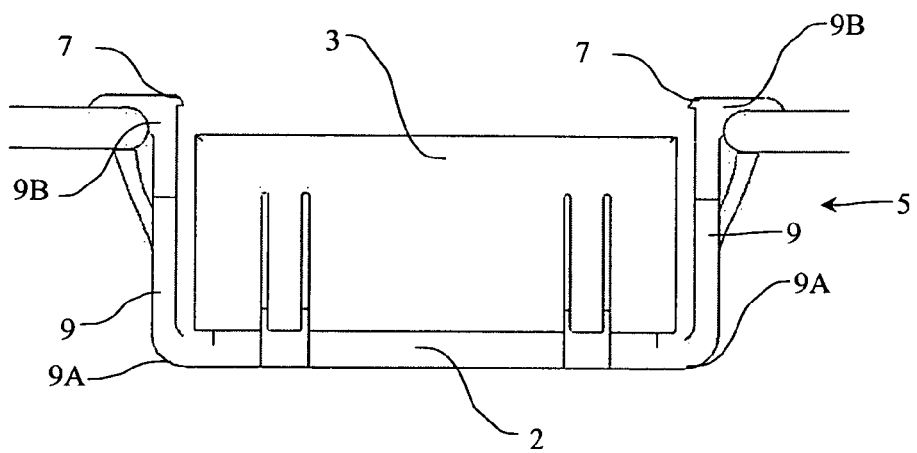
FIG. 5 represents a side view of the detection device according to FIG. 1, fixed onto a support and in an active state.

Securing means 5 further comprise locking means 7 designed to keep the two parts 2, 3 of case 1 in one of the two operating positions. According to this embodiment, as represented in FIG. 3, locking means 7 comprise at least one spigot able to be coupled with second part 3 of case 1, in particular at the level of an external surface. Locking means 7 keep the two parts 2, 3 in the second operating position. Electric contact 4 is then in a closed electric state. Inversely, electric contact 4 is in an open electric state when first and second parts 2, 3 are in the first operating position.

According to this embodiment, securing means 5 comprise at least one flexible arm 9 having a first end 9A integral to first part 2 and a second end 9B comprising locking means 7. Flexible arm or arms 9 extend substantially parallel to the side walls of first part 2. Locking means 7 are designed to be coupled to second part 3 in the second operating position, the detection device not being fixed on external support 6.

According to this embodiment of the invention, securing means 5 comprise two flexible arms 9 arranged in uniform manner on a peripheral surface of first part 2 of case 1. As represented in FIGS. 1 to 5, the two flexible arms 9 of securing means 5 are placed respectively on two parallel faces of case 1.

When the detection device is fixed onto external support 6, in particular on the meshes of the trellis of the vehicle seat, flexible arms 9 of securing means 5 are slightly separated so that hooks 10 of securing means 5 couple with the meshes of the trellis. Movement of flexible arms 9 of securing means 5 renders locking means 7 inoperative. When flexible arms 9 are separated, the spigot or spigots of locking means 7 are in fact no longer in contact with second part 3 of case 1. This unlatching of parts 2, 3 of case 1 then releases the action of the compression spring of holding means 8. The two parts separate from one another to move from the second operating position to the first operating position. Electric contact 4, which was in a closed electric state before installation of the device detection, is now in an open electric state.

Fitting of the detection device on external support 6 results in an automatic change of the electric state of electric contact 4. According to this embodiment of the invention, the electric contact in fact switches from a closed electric state to an open electric state.

By checking that electric contact 4 is in an open electric state after the detection device has been fixed on external support 6, it is thereby possible to ensure that securing means 5 are correctly fixed on external support 6.

If securing means 5 are not correctly fixed, then locking means 7 can still be operational and perform holding of parts 2, 3 in the second operating position. According to this embodiment example, the flexible arms have not been sufficiently separated to allow hooks 10 to couple with the meshes of the trellis, and the spigots of locking means 7 are still coupled with second part 3. After the detection device has been fitted, electric contact 4 is then still in a closed electric state which could be analyzed as a securing fault of said device.

Locking means 7 are and remain inoperative so long as securing means 5 are coupled with external support 6. In other words, fixing of the case on external support 6 by the securing means renders locking means 7 inoperative.

When the detection device is fixed to external support 6, the two parts 2, 3 of case 1 can move freely from the first operating position to the second operating position. The detection device can switch successively from an active detection state to an inactive detection state and vice-versa. These changes of state of the detection device accompanying switching from a closed electric state to an open electric state of electric contact 4 are taken into account by the processing means.

By default, according to this embodiment, securing means 8 tend to position parts 2, 3 in the first operating position of the detection device. Contact 4 of said device is then in an open electric state and the detection device is then in an inactive detection state. When a displacement force is applied on second part 3 and tends to make the latter move towards first part 2 opposing the holding force of holding means 8, electric contact 4 will switch from an open electric state to a closed electric state. This change of state is responsible for a signal being sent to the processing means.

When the detection device is designed to be used in a seat, the displacement force is generally due to the presence of a person on the seating surface of the seat. Deformation of the seating surface of the seat in the presence of a person results in displacement of one of the parts of the case, in particular second part 3.

As soon as the displacement force is no longer applied, i.e. when the person gets off the seat, the locking means being inoperative, the detection device leaves the second operating position and repositions itself in the first operating position. Electric contact 4 will switch from a closed electric state to an open electric state.

According to a first alternative embodiment of the invention, locking means 7 comprise at least one spigot able to couple with an opening 11 present in second part 3 of case 1. Opening or openings 11 are preferably situated in a side wall of second part 3.

Figure 6:
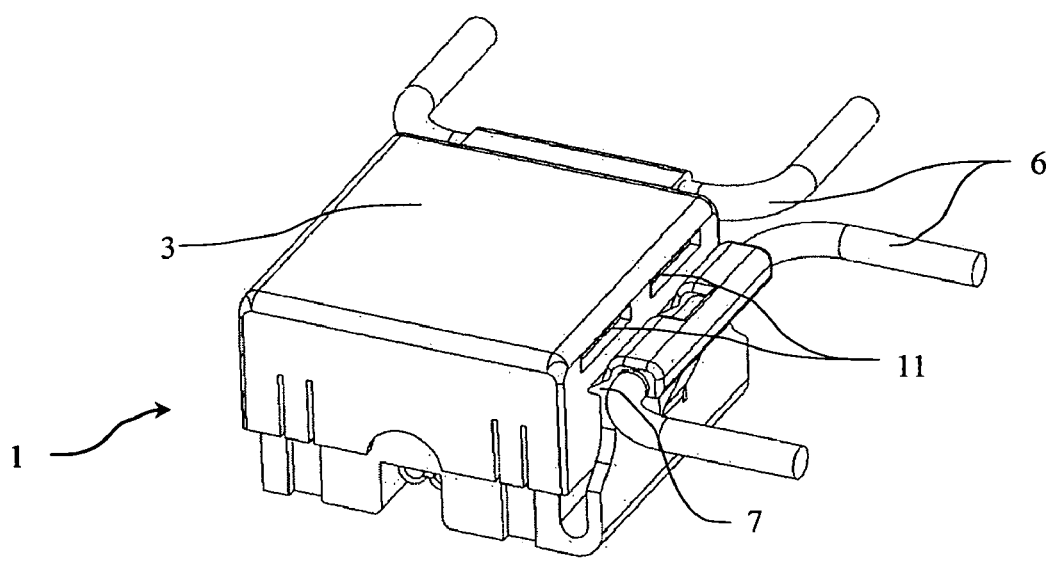
FIG. 6 represents an alternative embodiment of the detection device according to FIG. 1.

According to a second alternative embodiment, as represented in FIG. 6, the securing means 5 comprise two flexible arms 9 arranged in non-uniform manner on a peripheral surface of first part 2. The two flexible arms 9 of securing means 5 are respectively placed on two perpendicular faces of first part 2 of case 1.

The detection device is particularly designed to be combined with a seat, in particular an automobile seat. The seat comprises at least one deformable seating surface designed for a person to sit on. The seating surface comprising a deformable foam is connected to a rigid frame designed to be fixed to a vehicle. Detection device 1 as defined above is secured by its securing means 5 under the seating surface so that the deformable foam can directly command movement of second part 3 of case 1 to the second operating position when deformation of the seating surface takes place.

The detection device is connected to analysis means of the vehicle. The information provided by said detection device can be combined with analysis of other functional parameters of a vehicle.

According to a particular embodiment of the seat, the deformable foam is in direct contact with second part 3.

According to an alternative embodiment of the seat, said seat comprises a backrest in which a detection device 1 according to the invention is positioned. The detection device tends to detect deformation of a first part of the backrest with respect to a second part of the backrest.

The invention claimed is:

1. A detection device comprising:
    a case formed by at least a first and second part able to move in translation with respect to one another between a first and second operating position,
    holding means exerting a holding force opposing movement of the first and second parts from the first operating position to the second operating position,
    an electric contact comprising at least two electric states, closed or open, each electric state being associated with one of the operating positions of the first and second parts,
    securing means designed to secure said case on an external support,
    wherein the securing means comprise locking means keeping the two parts of the case in the second operating position when the case is not fixed, the locking means being inoperative when the case is fixed on the support.

2. The detection device according to claim 1 wherein the electric contact is in a closed electric state when the two parts are in the second operating position, the electric contact being in an open electric state when the first and second part are in the first operating position.

3. The detection device according to claim 1 wherein the securing means comprise at least one flexible arm having a first end integral to the first part and a second end comprising the locking means designed to be coupled with the second part in the second operating position.

4. The detection device according to claim 1 wherein the second part is sliding with respect to the first part of the case.

5. The detection device according to claim 1 wherein the securing means comprise flexible arms arranged in uniform manner on a peripheral surface of the first part of the case.

6. A seat comprising at least a deformable seating surface on which a passenger is to sit, a rigid frame designed to be fixed to a vehicle, wherein a detection device according to claim 1 is secured by the securing means under the seating surface.

7. The seat according to claim 6 wherein the seating surface comprises a deformable foam directly commanding movement of the second part of the case to the first operating position.

8. The seat according to claim 7 wherein the deformable foam is in contact with the second part.

9. The seat according to claim 8 comprising a backrest in which a detection device comprising:
    a case formed by at least a first and second part able to move in translation with respect to one another between a first and second operating position,
    holding means exerting a holding force opposing movement of the first and second parts from the first operating position to the second operating position,
    an electric contact comprising at least two electric states, closed or open, each electric state being associated with one of the operating positions of the first and second parts, and
    securing means designed to secure said case on an external support,
    wherein the securing means comprise locking means keeping the two parts of the case in the second operating position when the case is not fixed, the locking means being inoperative when the case is fixed on the support, is positioned and detects deformation of a first part of the backrest with respect to a second part of the backrest.

\* \* \* \* \*